United States Patent
Fang et al.

(10) Patent No.: US 8,950,218 B2
(45) Date of Patent: Feb. 10, 2015

(54) HEATING APPARATUS OF INDUCTION FURNACE USED FOR STRETCHING LARGE-DIAMETER PREFORMED RODS OF OPTICAL FIBERS

(75) Inventors: Dongquan Fang, Hubei (CN); Tao Wang, Hubei (CN); Jianhua Sun, Hubei (CN)

(73) Assignee: Yangze Optical Fibre and Cable Company Ltd., Wuhan, Hubei (CN)

( * ) Notice: Subject to any disclaimer, the term of this patent is extended or adjusted under 35 U.S.C. 154(b) by 51 days.

(21) Appl. No.: 14/112,686

(22) PCT Filed: Nov. 15, 2011

(86) PCT No.: PCT/CN2011/082236
§ 371 (c)(1),
(2), (4) Date: Oct. 18, 2013

(87) PCT Pub. No.: WO2012/163053
PCT Pub. Date: Dec. 6, 2012

(65) Prior Publication Data
US 2014/0041416 A1    Feb. 13, 2014

(30) Foreign Application Priority Data
May 31, 2011    (CN) .......................... 2011 1 0143621

(51) Int. Cl.
*C03B 37/029*    (2006.01)
(52) U.S. Cl.
CPC ........... *C03B 37/029* (2013.01); *C03B 2205/80* (2013.01); *C03B 2205/64* (2013.01)
USPC ............................................. 65/537; 65/533

(58) Field of Classification Search
CPC .............. C03B 37/029; C03B 2205/64; C03B 2205/80
See application file for complete search history.

(56) References Cited

U.S. PATENT DOCUMENTS 4,547,644 A * 10/1985 Bair et al. ..................... 219/634
6,668,592 B1   12/2003 Taru et al.
(Continued)

FOREIGN PATENT DOCUMENTS

CN          1354731 A      6/2002
CN        201003032 Y      1/2008
(Continued)

OTHER PUBLICATIONS

State Intellectual Property Office of the People's Republic of China (ISA/CN), "Written Opinion of the International Searching Authority", China, Mar. 8, 2012.
(Continued)

*Primary Examiner* — Lisa Herring
(74) *Attorney, Agent, or Firm* — Tim Tingkang Xia, Esq.; Morris, Manning & Martin, LLP

(57) ABSTRACT

A heating apparatus of an induction furnace used for stretching large-diameter preformed rods of optical fibers, said heating apparatus of the induction furnace comprising a furnace casing, a graphite exothermic sleeve, an insulating layer and an induction coil. At the upper end of the graphite exothermic sleeve is provided a floating seal gland, the inner bore thereof being adapted to the upper end of the graphite exothermic sleeve, and the outer periphery of the floating seal gland being adapted to the top cover plate furnace hole of the furnace casing. The use of the floating seal gland increases furnace stability and prolongs furnace life.

5 Claims, 2 Drawing Sheets

(56) References Cited

U.S. PATENT DOCUMENTS

| | | | |
|---|---|---|---|
| 2002/0088253 A1* | 7/2002 | Roba et al. | 65/481 |
| 2002/0178762 A1* | 12/2002 | Foster et al. | 65/424 |
| 2005/0016219 A1* | 1/2005 | Rajala et al. | 65/537 |
| 2005/0115278 A1* | 6/2005 | Mattila | 65/533 |

FOREIGN PATENT DOCUMENTS

| | | | |
|---|---|---|---|
| CN | 101328013 A | | 12/2008 |
| CN | 101362628 A | | 2/2009 |
| CN | 201626915 U | | 11/2010 |
| EP | 1129999 A2 | | 9/2001 |
| JP | 2003212561 A | | 7/2003 |

OTHER PUBLICATIONS

State Intellectual Property Office of the People's Republic of China, "Office Action", China, Apr. 22, 2013.

State Intellectual Property Office of the People's Republic of China, "Office Action and Search Report", China, Sep. 6, 2012.

State Intellectual Property Office of the People's Republic of China, "International Search Report", China, Mar. 8, 2012.

* cited by examiner

HEATING APPARATUS OF INDUCTION FURNACE USED FOR STRETCHING LARGE-DIAMETER PREFORMED RODS OF OPTICAL FIBERS

FIELD OF THE INVENTION

The present invention relates generally to optical fiber manufacturing, and more particularly to a heating apparatus of an induced fiber drawing furnace for large-diameter preformed rods of optical fibers, used for manufacturing optical fibers for communications.

BACKGROUND OF THE INVENTION

The optical fiber drawing is a procedure of completing fiber drawing and forming after melting an optical fiber preformed rod at a high temperature through a fiber drawing furnace. The existing optical fiber drawing furnace heating apparatus is mainly formed of a furnace casing, an exothermic sleeve mounted in the furnace cavity, a heat-insulation layer mounted around the exothermic sleeve, and an induction coil. The existing optical fiber drawing furnace is mainly suitable for machining an optical fiber preformed rod with the diameter being 60 to 80 mm. With developments of optical fiber technologies, the field of the optical fiber drawing begins to seek for the fiber drawing of an optical fiber preformed rod with the diameter being greater than 100 mm, so as to reduce the cost of the optical fiber drawing to a large extent, and improve the manufacturing efficiency of the fiber drawing devices. Conventionally, it is difficult for the existing optical fiber drawing furnaces, due to being subject to restriction of many factors such as structures of main components and the exothermic amount gradient distribution, to adapt to fiber drawing and machining of a large-diameter optical fiber preformed rod. Thus, researches and developments of a large-diameter preformed rod fiber drawing furnace are very pivotal.

SUMMARY OF THE INVENTION

Embodiments of the present invention provide a heating apparatus of an induced fiber drawing furnace usable for fiber drawing and machining of a large-diameter optical fiber preformed rod, so as to solve the technical problems existing in the existing technology. The heating apparatus of the induced fiber drawing furnace is simple in structure, and stable in working performance.

In one aspect of the present invention, the heating apparatus includes a cannular furnace casing, a graphite exothermic sleeve mounted in a furnace cavity defined by cannular furnace casing, a heat-insulation layer surrounding around the graphite exothermic sleeve and an induction coil surrounding the heat-insulation layer.

In one embodiment, the diameter of the bore of the graphite exothermic sleeve is in a range of 150 to 240 mm. The axial length of the graphite exothermic sleeve is in a range of 500 to 800 mm. The maximum power of the induction coil is in a range of 80 to 100 kilowatt. The upper end of the graphite exothermic sleeve is provided with a floating sealing gland, the bore of the floating sealing gland is matched with the upper end of the graphite exothermic sleeve, and the periphery of the floating sealing gland is matched with the furnace cavity aperture of a top cover plate of the furnace casing.

In one embodiment, the outlet of the furnace cavity at the lower end of the graphite exothermic sleeve is inward shrunk into a shape of a taper sleeve, an included angle between the conical surface of the taper sleeve and the end face of the large end of the taper sleeve is in a range of 70° to 85°, and the axial length of the taper sleeve is in a range of 80 to 400 mm.

In one embodiment, the lower end of the furnace casing is correspondingly inward shrunk into a shape of a frustum, and an included angle between the conical surface of the frustum and the end face of the large end of the frustum is in a range of 30° to 50°.

In one embodiment, the heat-insulation layer is formed by reeling in a rectangular soft long fiber graphite felt into a reeled cannula, the number of reeling layers is in a range of 3 to 10, and the single-sided thickness of the heat-insulation layer is in a range of 20 to 30 mm.

In one embodiment, the furnace cavity aperture of the top cover plate is provided with 2 layers of seal rings, and the two layers of seal rings are matched with the periphery of the floating sealing gland.

In one embodiment, the middle of the floating sealing gland is provided with a through-hole corresponding to the bore of the graphite exothermic sleeve, the lower end face of the floating sealing gland is provided with an annular spigot, and the bore and the inner end face of the annular spigot are matched with the graphite exothermic sleeve.

In one embodiment, the end face of the large end of the lower frustum in the furnace casing is provided with a glass support frame, and the glass support frame is engaged with the lower end of the heat-insulation layer.

In one embodiment, the induction coil is mounted above the glass support frame in the furnace casing.

Among other things, beneficial effects of the present invention includes: (1) effective fiber drawing and machining can be performed on a large-diameter optical fiber preformed rod with the diameter being 100 to 200 mm; (2) through the change of the shape of the lower end of the exothermic sleeve, and the reasonable layout of the heat-insulation layer and the induction coil in the furnace casing, the temperature gradient distribution of the fiber drawing furnace is more suitable for temperature distribution requirements of fiber drawing and forming; (3) the structure of the floating sealing gland can better adapt to expansion caused by heat and contraction caused by cold of the graphite exothermic sleeve, and compared with a fixed gland, damage and invalidation of components such as the exothermic sleeve can be effectively prevented, so as to guarantee the seal of the cavity in the furnace casing, and improve working stability and service life of the fiber drawing furnace; (4) the heat-insulation layer is formed by reeling in a soft long fiber graphite felt into a reeled cannula; not only the heat-insulation effect is good, and the inductive exothermic amount is extremely low, but also the structure is simple, it is convenient for manufacturing and the manufacturing cost is low.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DESCRIPTION OF EMBODIMENTS OF THE INVENTION

Figure 1:
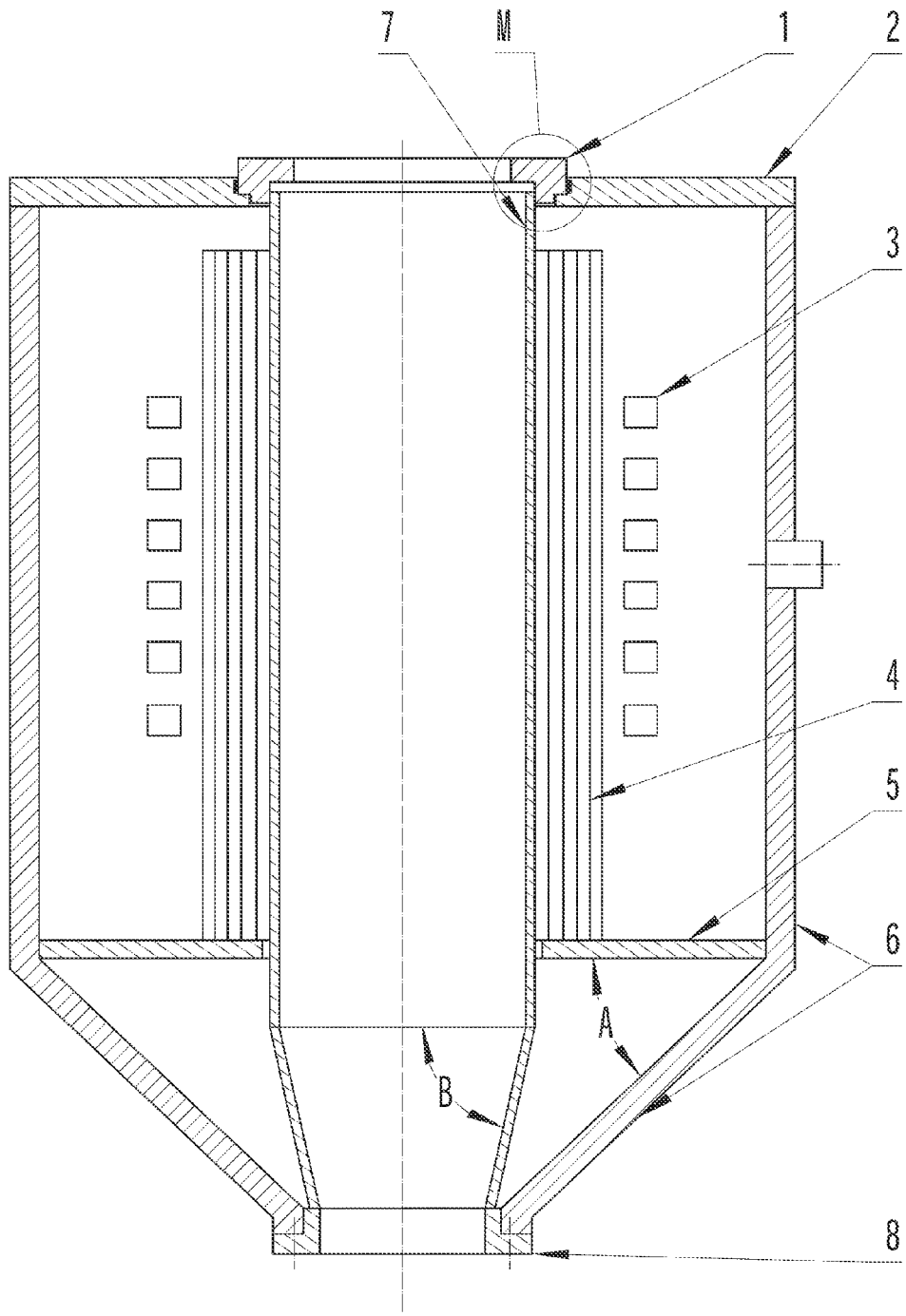
FIG. 1 shows a front cross sectional view of a schematic structure of a heating apparatus according to one embodiment of the present invention.

The present invention is more particularly described in the following examples that are intended as illustrative only since numerous modifications and variations therein will be apparent to those skilled in the art. Various embodiments of the invention are now described in detail in conjunction with the accompanying drawings. Referring to the drawings, like numbers indicate like components throughout the views.

In accordance with the purposes of this invention, as embodied and broadly described herein, this invention, in one aspect, relates to a heating apparatus of an induced fiber drawing furnace for large-diameter preformed rods of optical fibers, used for manufacturing optical fibers for communications.

Figure 2:
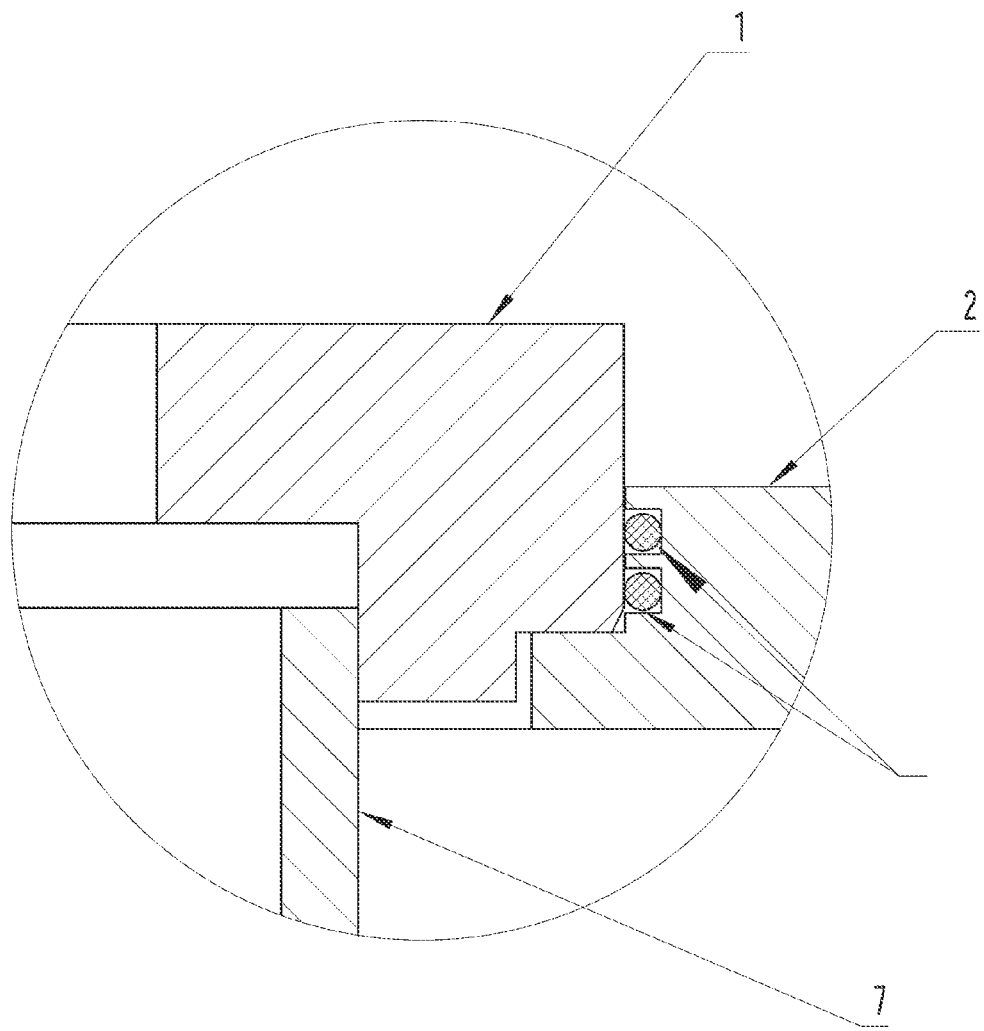
FIG. 2 is an enlarged view of the position M shown in FIG. 1.

Referring to FIGS. 1 and 2, and particularly to FIG. 1, a schematic structure of a heating apparatus of an induced fiber drawing furnace for machining and drawing large-diameter optical fiber preformed rods is shown according to one embodiment of the present invention. In this embodiment, the heating apparatus includes a cannular furnace casing 6. The upper portion of the furnace casing 6 is provided with a top cover plate 2. The lower end of the furnace casing 6 is correspondingly inward shrunk into a shape of a frustum, where an included angle A between the conical surface of the frustum and the end face of the large end of the frustum is equal to 40°. The middle part of the furnace casing 6 is provided with a furnace cavity whose upper portion and lower portion are in communication with each other. The furnace cavity is internally provided with a graphite exothermic sleeve 7. The graphite exothermic sleeve 7 is in a round sleeve shape, the bore diameter thereof is in a range of 150 to 240 mm. The axial length thereof is in a range of 500 to 800 mm. The lower end of the graphite exothermic sleeve 7 is the outlet of the furnace cavity, and is inward shrunk into a shape of a taper sleeve. An included angle B between the conical surface of the taper sleeve and the end face of the large end of the taper sleeve is 78°. The axial length of the taper sleeve is 120 mm. The lower end of the taper sleeve is connected to a furnace bottom sealing plate 8 mounted at the port. A heat-insulation layer 4 surrounds around the graphite exothermic sleeve 7. The heat-insulation layer 4 is externally provided with an induction coil 3, which in this exemplary embodiment surrounds the heat-insulation layer 4. The heat-insulation layer 4 is formed by reeling in a rectangular soft long fiber graphite felt into a reeled cannula, where the number of reeling layers is 6, and the single-sided thickness of the heat-insulation layer is 25 mm. The end face of the large end of the lower frustum in the furnace casing 6 is provided with a glass support frame 5, and the glass support frame is engaged with the lower end of the heat-insulation layer. The induction coil 3 is mounted above the glass support frame in the furnace casing. The maximum power of the induction coil 3 is in a range of 80 to 100 kilowatt. The upper end of the graphite exothermic sleeve 7 is provided with a floating sealing gland 1. The middle of the floating sealing gland 1 is provided with a through-hole corresponding to the bore of the graphite exothermic sleeve 7. The lower end face of the floating sealing gland 1 is provided with an annular spigot, where the bore and the inner end face of the annular spigot are matched with the graphite exothermic sleeve 7. The periphery of the floating sealing gland 1 is matched with the furnace cavity aperture of the top cover plate of the furnace casing 6. The furnace cavity aperture of the top cover plate is provided with two layers of seal rings 9. The two layers of seal rings are matched with the periphery of the floating sealing gland 1. The floating sealing gland 1 is matched with the seal rings 9 of the furnace cavity aperture of the top cover plate in a floating manner, and no bolt is required for locking. When the graphite exothermic sleeve 7 pushes the floating sealing gland 1 during upward stretching and downward contracting due to expansion caused by heat and contraction caused by cold, the floating sealing gland ascends or descends due to the dead load, the displacement can be up to 10 to 20 mm, and the seal of the cavity in the furnace casing is always maintained. The furnace casing 6 is filled with an inert gas and a positive pressure is maintained.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A heating apparatus of an induced fiber drawing furnace for large-diameter optical fiber preformed rods, comprising:
    a cannular furnace casing defining a furnace cavity;
    a graphite exothermic sleeve defining a bore, mounted in the furnace cavity;
    a heat-insulation layer surrounding the graphite exothermic sleeve; and
    an induction coil surrounding the heat-insulation layer,
    wherein a diameter of the bore of the graphite exothermic sleeve is in a range of 150 to 240 mm, and an axial length of the graphite exothermic sleeve is in a range of 500 to 800 mm;
    wherein a maximum power of the induction coil is in a range of 80 to 100 kilowatts;
    wherein an upper end of the graphite exothermic sleeve is provided with a floating sealing gland, a bore of the floating sealing gland is matched with the upper end of the graphite exothermic sleeve, and a periphery of the floating sealing gland is matched with a furnace cavity aperture of a top cover plate of the furnace casing;
    wherein an outlet of the furnace cavity at the lower end of the graphite exothermic sleeve is inward shrunk into a shape of a taper sleeve, an included angle between a conical surface of the taper sleeve and an end face of the large end of the taper sleeve is in a range of 70° to 85°, and an axial length of the taper sleeve is in a range of 80 to 400 mm;
    wherein the lower end of the furnace casing is correspondingly inward shrunk into a shape of a frustum, and an included angle between a conical surface of the frustum and an end face of the large end of the frustum is in a range of 30° to 50°; and wherein the furnace cavity aperture of the top cover plate is provided with two layers of seal rings, and the two layers of seal rings are matched with the periphery of the floating sealing gland.

2. The heating apparatus according to claim 1, wherein the heat-insulation layer is formed by reeling in a rectangular soft long fiber graphite felt into a reeled cannula, the number of reeling layers is in a range of 3 to 10, and a single-sided thickness of the heat-insulation layer is in a range of 20 to 30 mm.

3. The heating apparatus according to claim 1, wherein the middle of the floating sealing gland is provided with a through-hole corresponding to the bore of the graphite exothermic sleeve, the lower end face of the floating sealing gland is provided with an annular spigot, and the bore and the inner end face of the annular spigot are matched with the graphite exothermic sleeve.

4. The heating apparatus according to claim 1, wherein the end face of the large end of the lower frustum in the furnace casing is provided with a glass support frame, and the glass support frame is engaged with the lower end of the heat-insulation layer.

5. The heating apparatus according to claim 4, wherein the induction coil is mounted above the glass support frame in the furnace casing.

\* \* \* \* \*